(12) United States Patent
Mirth et al.

(10) Patent No.: US 12,461,509 B2
(45) Date of Patent: Nov. 4, 2025

(54) SYSTEMS AND METHODS FOR ARTIFICIAL INTELLIGENCE-BASED SECURITY POLICY DEVELOPMENT

(71) Applicant: Rockwell Automation Technologies, Inc., Mayfield Heights, OH (US)

(72) Inventors: Timothy C. Mirth, Hudson, OH (US); Taryl J. Jasper, Concord Township, OH (US); Terence S. Tenorio, Solon, OH (US); Thaddeus A. Palus, Denver, CO (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 575 days.

(21) Appl. No.: 17/870,352

(22) Filed: Jul. 21, 2022

(65) Prior Publication Data
US 2024/0028009 A1 Jan. 25, 2024

(51) Int. Cl.
*G05B 19/418* (2006.01)
(52) U.S. Cl.
CPC .................. *G05B 19/4185* (2013.01)
(58) Field of Classification Search
CPC . G06N 20/00; H04L 63/1416; H04L 63/1425; H04L 63/1433; H04L 63/1408; H04L 63/1441; G06F 21/577; G06F 21/554; G06F 21/552; G06F 21/566; G06F 21/6254; G05B 23/0272; G05B 2219/2642
See application file for complete search history.

(56) References Cited

U.S. PATENT DOCUMENTS

| | | | |
|---|---|---|---|
| 10,026,049 B2 * | 7/2018 | Asenjo | G06Q 10/06 |
| 10,963,590 B1 * | 3/2021 | Dash | G06F 21/604 |
| 10,970,395 B1 | 4/2021 | Bansal et al. | |
| 10,984,113 B1 | 4/2021 | Dhaliwal et al. | |
| 11,144,039 B2 * | 10/2021 | Maturana | G05B 19/4183 |
| 11,314,493 B1 * | 4/2022 | Stump | G06F 11/3664 |

(Continued)

FOREIGN PATENT DOCUMENTS

| | | |
|---|---|---|
| CN | 105956469 A | 9/2016 |
| CN | 103795723 B | 2/2017 |
| WO | 2021/262757 A1 | 12/2021 |

OTHER PUBLICATIONS

Extended European Search Report for Application No. 23181461.7 mailed Dec. 4, 2023, 8 pages.

*Primary Examiner* — Darrin D Dunn
(74) *Attorney, Agent, or Firm* — Fletcher Yoder, P.C.

(57) ABSTRACT

A method includes receiving, from an enterprise network, data associated with one or more industrial automation systems operated by an enterprise, wherein the data includes design artifacts of the one or more industrial automation systems, run time data collected from the one or more industrial automation systems, or both, inputting the data to a machine learning-based security policy development engine to generate a set of recommended security policies for the enterprise based on the data, receiving the set of recommended security policies for the one or more industrial automation systems output by the security policy development engine, wherein the set of recommended security policies define access, use, or both, of the one or more industrial automation systems operated by the enterprise; and transmitting the set of recommended security policies to the enterprise.

20 Claims, 6 Drawing Sheets

(56) References Cited

U.S. PATENT DOCUMENTS

| | | | |
|---|---|---|---|
| 2013/0031037 A1* | 1/2013 | Brandt | H04L 63/1408 706/12 |
| 2014/0047551 A1* | 2/2014 | Nagasundaram | G06F 16/285 726/26 |
| 2014/0337429 A1* | 11/2014 | Asenjo | H04L 67/10 709/204 |
| 2016/0180078 A1* | 6/2016 | Chhabra | G06F 21/57 726/19 |
| 2019/0156061 A1* | 5/2019 | Chakraborty | H04L 63/0421 |
| 2020/0103871 A1* | 4/2020 | Laycock | G06Q 50/04 |
| 2021/0200657 A1* | 7/2021 | Udipi | H04L 67/125 |
| 2021/0351980 A1* | 11/2021 | Huffman | H04L 63/1416 |
| 2022/0253554 A1* | 8/2022 | Goldsteen | G06F 21/6254 |
| 2023/0102732 A1* | 3/2023 | Yoo | G06N 20/20 726/26 |
| 2023/0289623 A1* | 9/2023 | Zhang | G05B 13/0265 |
| 2023/0368042 A1* | 11/2023 | Koppisetty | G06N 5/022 |
| 2023/0401624 A1* | 12/2023 | Bose | G06N 5/022 |

\* cited by examiner

SYSTEMS AND METHODS FOR ARTIFICIAL INTELLIGENCE-BASED SECURITY POLICY DEVELOPMENT

BACKGROUND

The present disclosure generally relates to developing security policies for an operational technology (OT) network.

Industrial automation systems may be used to provide automated control of one or more actuators in an industrial setting. OT networks may be used to communicatively couple industrial automation systems and/or industrial automation components within an industrial automation system. Security policies may dictate access and use of OT assets within the OT network. Typically, security policies are manually created and enforced by one or more network administrators. Accordingly, the effectiveness of a set of security policies may be dependent upon the judgment and experience of the network administrators that create the policies. Further, security policy development tends to be reactive, addressing vulnerabilities that have already been exposed, rather than proactively finding new vulnerabilities. Given the rapidly-changing nature of information technology (IT) and OT network security, it may be desirable to develop improved techniques for developing security policies for OT networks.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor, cause the processor to receive data including design artifacts of the one or more industrial automation systems, run time data collected from the one or more industrial automation systems, or both, from one or more industrial automation systems, input the data to a machine learning-based security policy development engine to generate a set of recommended security policies for the one or more industrial automation systems based on the data, receive the set of recommended security policies for the one or more industrial automation systems output by the security policy development engine, and transmit the set of recommended security policies to the one or more industrial automation systems for implementation.

In another embodiment, a method includes receiving, from an enterprise network, data associated with one or more industrial automation systems operated by an enterprise, wherein the data includes design artifacts of the one or more industrial automation systems, run time data collected from the one or more industrial automation systems, or both, inputting the data to a machine learning-based security policy development engine to generate a set of recommended security policies for the enterprise based on the data, receiving the set of recommended security policies for the one or more industrial automation systems output by the security policy development engine, wherein the set of recommended security policies define access, use, or both, of the one or more industrial automation systems operated by the enterprise; and transmitting the set of recommended security policies to the enterprise.

In a further embodiment, an industrial automation system includes a memory and a processor. The memory stores instructions that, when executed by the processor, cause the processor to collect data from one or more connected industrial automation devices, wherein the data includes design artifacts of the one or more industrial automation devices, run time data collected from the one or more industrial automation devices, incident data for an operational technology network on which the one or more industrial automation devices operate, or any combination thereof, transmit the data to an enterprise control system of an enterprise that operates the one or more industrial automation devices, receive, from the enterprise control system, a set of recommended security policies wherein the set of recommended security policies define access, use, or both, of industrial automation assets, including the one or more industrial automation devices, operated by the enterprise, and implement one or more of the set of recommended security policies on the one or more industrial automation devices.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 5:
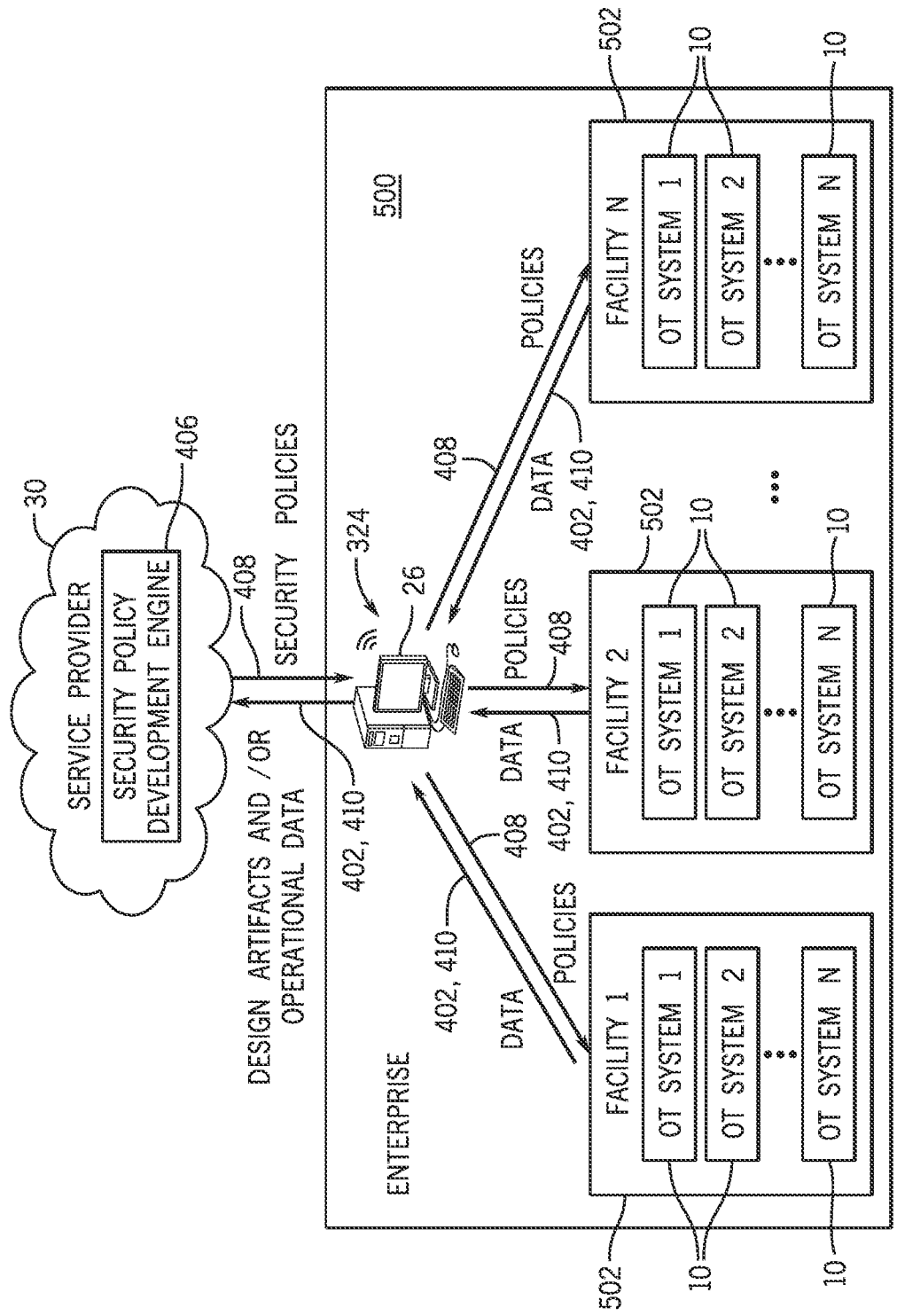
Figure 6:
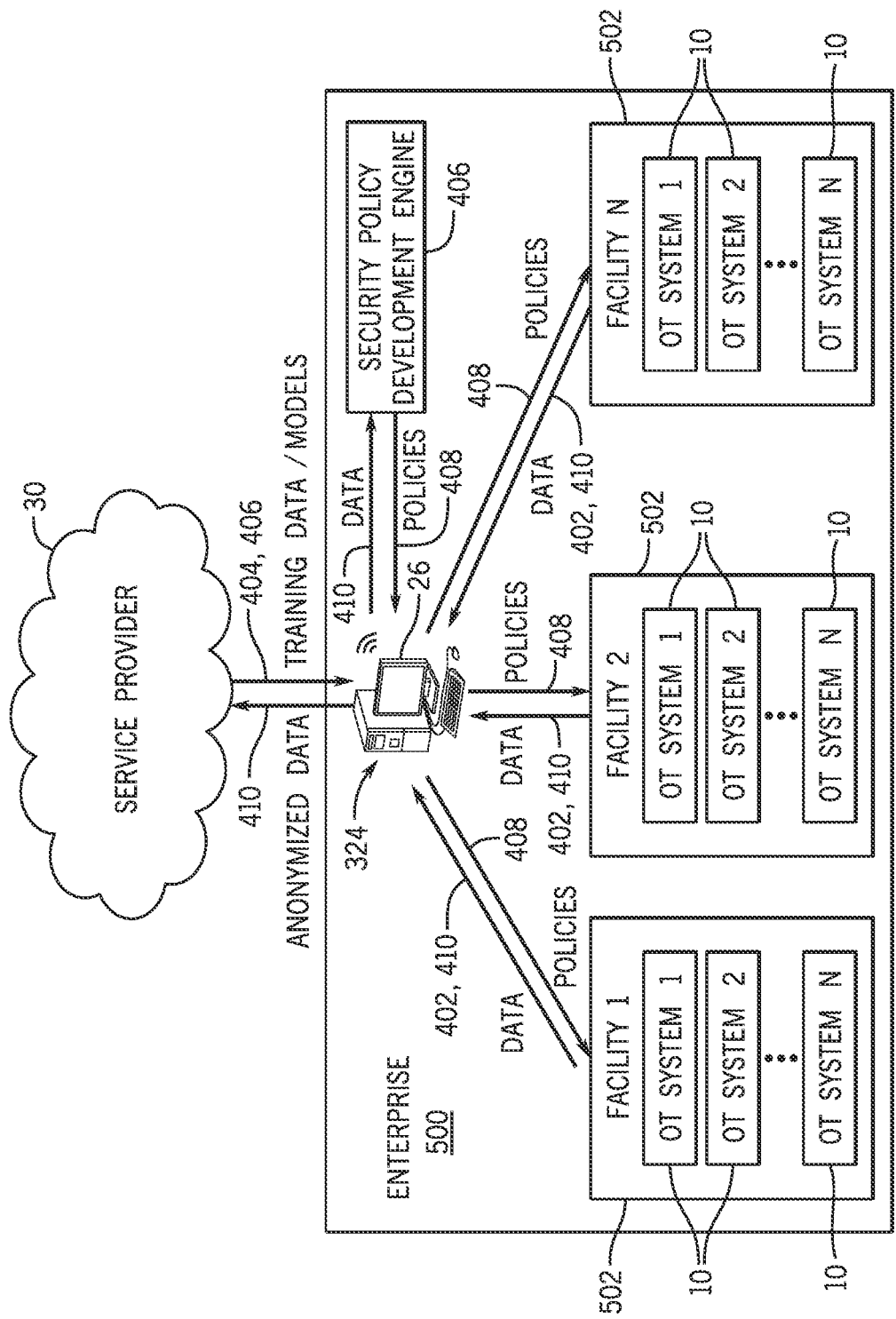

FIG. 5 is a schematic illustrating an architecture for providing security policies as a service to one or more enterprises, each operating one or more industrial automation systems, in accordance with embodiments presented herein; and FIG. 6 is a schematic illustrating an architecture for providing training data and/or machine learning models (e.g., a security policy development engine) to one or more enterprises, each operating one or more industrial automation systems, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for using an artificial intelligence (AI)-based security policy development engine to develop security policies based on operational technology (OT) system design artifacts and/or run-time data collected during operation of an OT system. In one embodiment, the AI-based security policy development engine is hosted by a service provider. Customers send design artifacts for OT systems to the service provider, the service provider runs the AI-based security policy development engine on the received design artifacts to generate a set of recommended security policies that are then provided to the customer. The customer may then choose whether or not to implement the recommended security policies in their OT system. Additionally or alternatively, the customer may collect run-time data from their OT system and provide the run-time data to the service provider, along with a set of existing security policies. The service provider runs the AI-based security policy development engine on the run-time data to generate a set of recommended changes to the existing security policies, which are subsequently provided to the customer. In such an embodiment, the AI-based security policy development engine may be continuously or periodically retrained or updated based on new data received from customers and/or internally generated data.

In another embodiment, the AI-based security policy development engine is provided to the customer by a service provider (e.g., RA) and hosted by the customer, either in the cloud, on-premises, or at a remote location. The AI-based security policy development engine may be provided to the customer already trained, the service provider may provide training data for training the AI-based security policy development engine, or the customer may choose to train the AI-based security policy development engine using its own training data. The customer provides design artifacts for an OT system to the AI-based security policy development engine, which generates a set of recommended security policies for the OT system. The customer may then implement the recommended security policies as they see fit. Additionally or alternatively, once security policies have been implemented on an OT system, the customer may collect run-time data from the OT system and periodically run the AI-based security policy development engine on the collected run-time data to generate a set of recommended changes or updates to the existing security policies. The customer may then determine whether or not to implement the recommended changes to the existing security policies. In some cases, if the customer chooses to, collected data (e.g., recommended security policies, recommended changes to security policies, run-time data from before and after security policies or changes to security policies were implemented, design artifacts, etc.) may be anonymized and provided to the service provider to contribute to the service provider's training data. Accordingly, the service provider may occasionally provide training updates to customers based on data collected from other customers that may be used to improve the AI-based security policy development engine hosted by the customer. Additional details with regard to developing security policies in accordance with the techniques described above will be provided below with reference to FIGS. 1-6.

Figure 1:
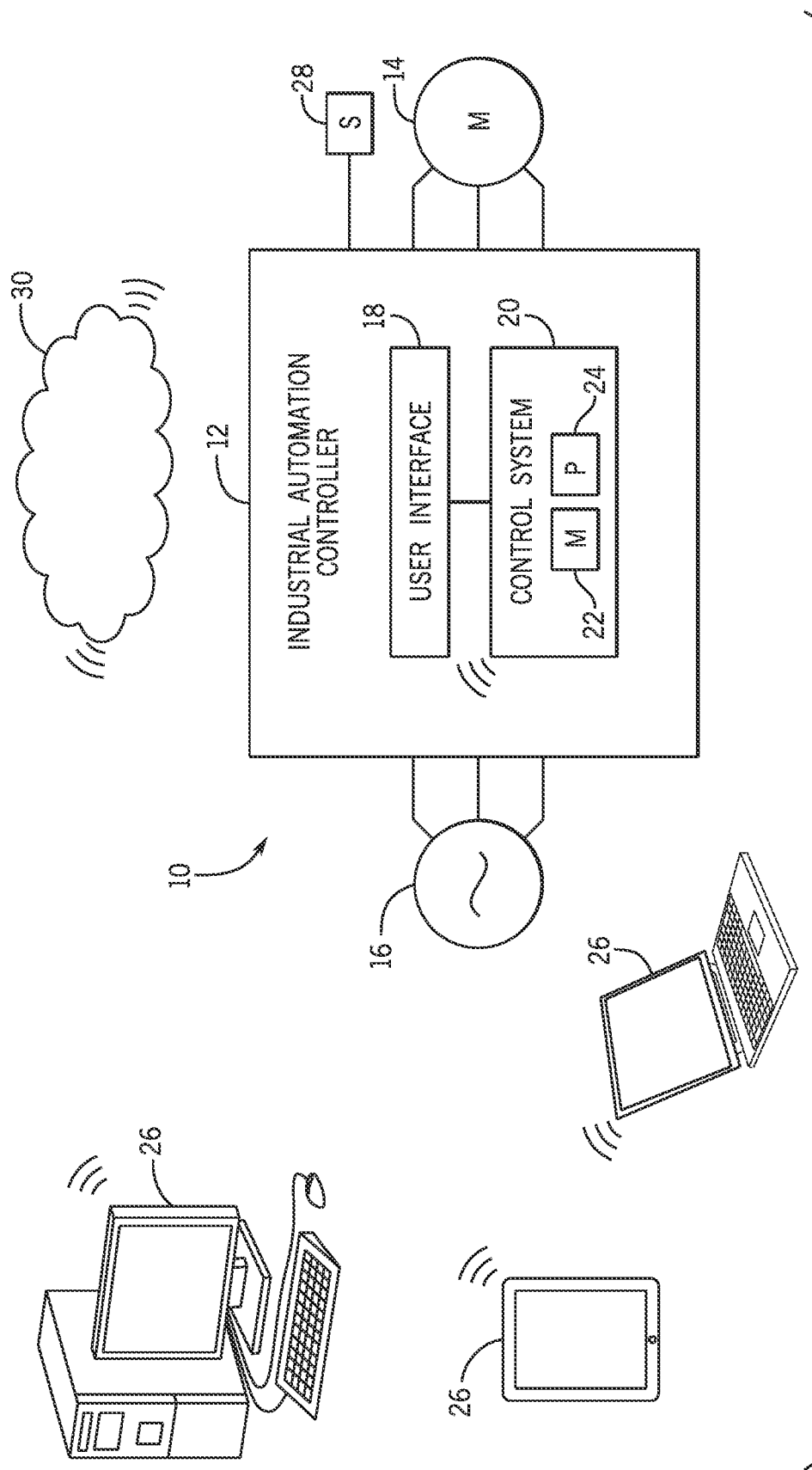
FIG. 1 illustrates a schematic view of an industrial automation system, in accordance with embodiments presented herein.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a web site accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop security policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
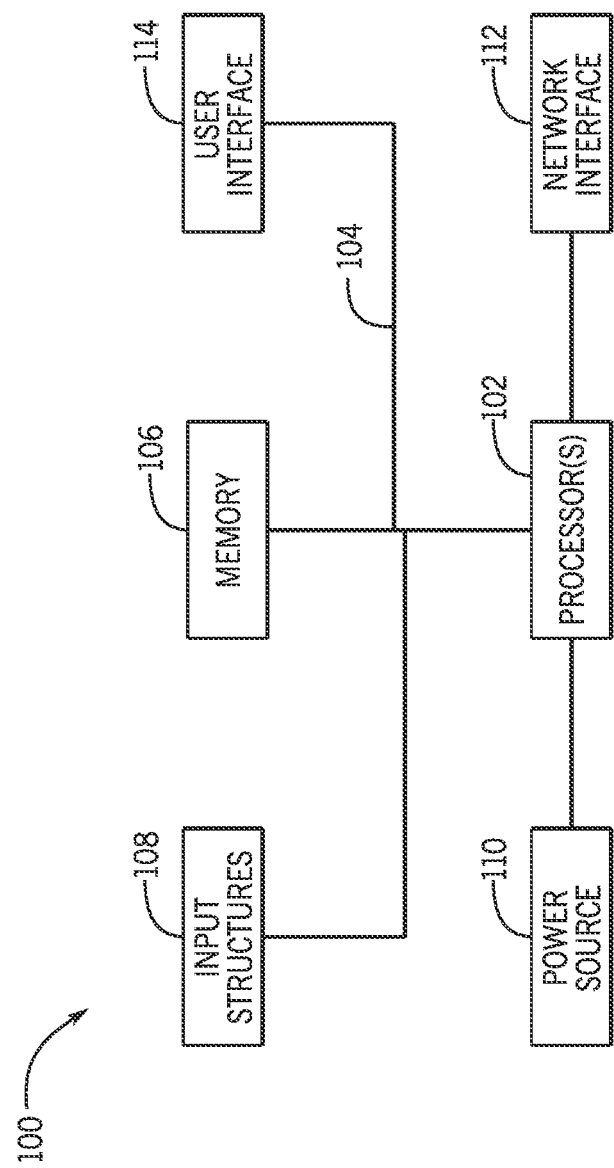
FIG. 2 illustrates a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
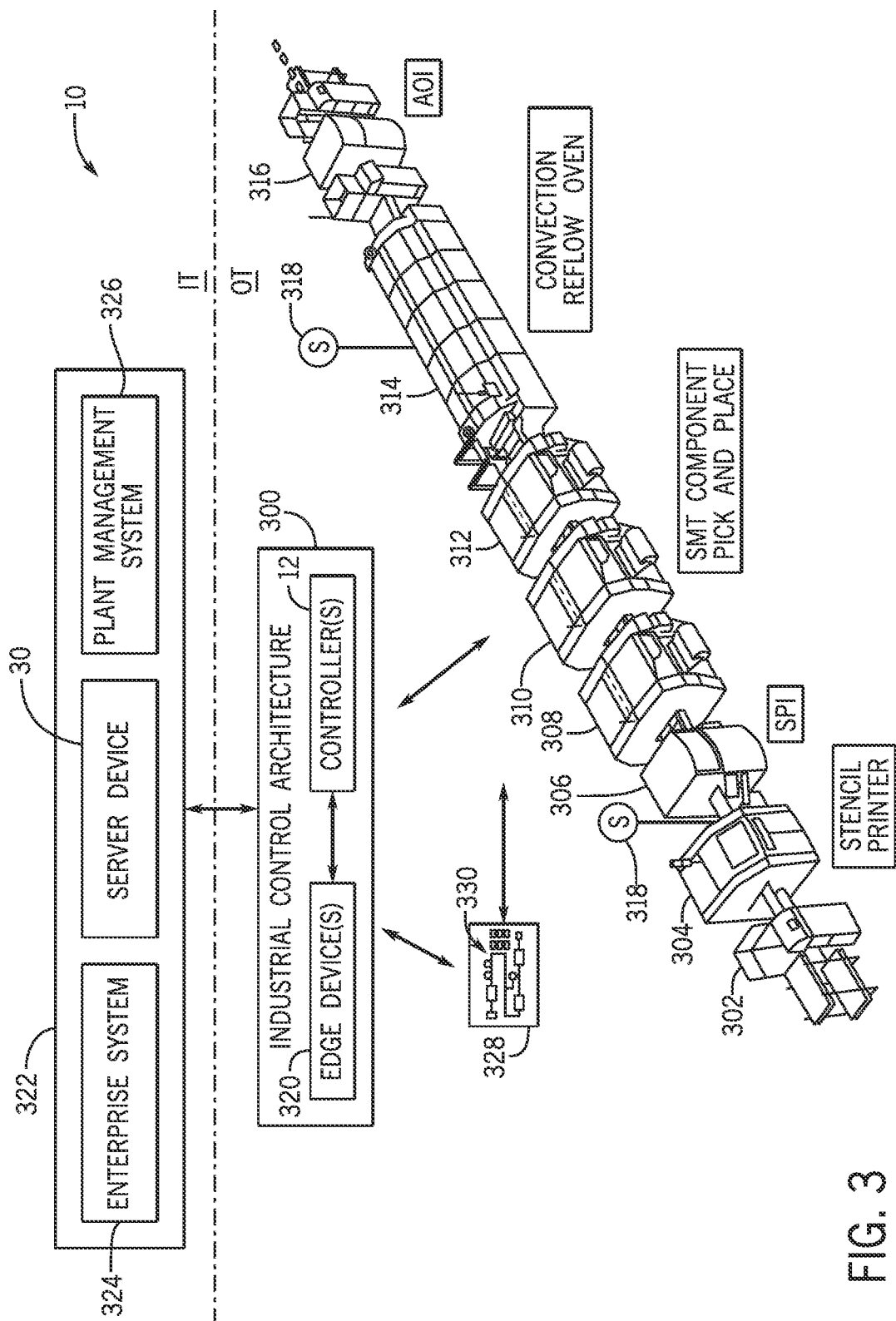
FIG. 3 illustrates a schematic of an example industrial automation system controlled by an industrial control architecture, in accordance with embodiments presented herein.

FIG. 3 is a perspective view of an example industrial automation system 10 controlled by an industrial control architecture 300. The industrial automation system 10 includes stations having machine components and/or machines (e.g., OT assets) to conduct functions within an automated process, such as silicon wafer manufacturing, as is depicted. The automated process may begin at station 302 used for loading objects, such as substrates, into the industrial automation system 10 via a conveyor section. The conveyor section may transport the objects to a station 304 to perform a first action, such as printing solder paste to the substrate via stenciling. As objects exist from the station 304, the conveyor section may transport the objects to a station 306 for solder paste inspection (SPI) to inspect printer results, to a station 308, 310, and 312 for surface mount technology (SMT) component placement, to a station 314 for a convection reflow oven to melt the solder to make electrical couplings, and finally to a station 316 for automated optical inspection (AOI) to inspect the object manufactured (e.g., the manufactured printed circuit board). After the objects have passed through the various stations, the objects may be removed from the station 316, for example, for storage in a warehouse or for shipment. It should be understood, however, for other applications, the particular system, machine components, machines, stations, and/or conveyors may be different from the system depicted in FIG. 3 or spatially adapted to the application.

For example, the industrial automation system 10 may include machinery (e.g., OT assets) to perform various operations in a compressor station, an oil refinery, a batch operation for making food items, pharmaceuticals, cosmetics, chemical processing operations, brewery operations, mining operations, a mechanized assembly line, and so forth. Accordingly, the industrial automation system 10 may include a variety of operational components (e.g., OT assets), such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with information technology (IT) data from an IT network, for storage in an IT network, or the like.

In certain embodiments, one or more properties of equipment of the industrial automation system 10, such as the stations 302, 304, 306, 308, 310, 312, 314, 316, may be monitored and controlled by the industrial automation system 10 for regulating control variables. For example, sensing devices (e.g., sensors 318) may monitor various properties of the industrial automation system 10 and may be used by the industrial control architecture 300 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control architecture 300 may receive data from the associated devices and use the data to perform their respective operations more efficiently. For example, a controller 12 of the industrial control architecture 300 may receive data regarding a temperature of a connected motor and may adjust operations of the motor drive based on the data.

An edge device 320 of the industrial control architecture 300 may automatically deploy, enforce, and/or implement one or more security updates to one or more policy enforcement points (e.g., OT assets) within the industrial automation system 10. As used herein, an "edge device" 320 is a device within the industrial automation system 10 that controls data flow within the industrial automation system 10 (e.g., the OT network) as well as between the industrial automation system 10 (e.g., the OT network) and an external network 322. For example, the edge device 320 may be a router, a switch, or the like. In certain embodiments, the edge device 320 may receive a security update from the external network 322 that includes an enterprise system 324, a server device 30, a plant management system 326, or the like. The enterprise system 324 may include software and/or hardware components that support business processes, information flows, reporting, data analytics, and the like for an enterprise. The server device 30 may include any suitable server computing device. In one embodiment, the server device 30 may include a security policy server that manages communication between the components of the industrial automation system 10. That is, the security policy server may manage one or more security policies that include provisions or instructions that detail how communication between the components of the industrial automation system 10 is performed. As such, the server device 30 may implement a security policy (e.g., a security update) related to centrally managing communications between the components of the industrial automation system 10. The plant management system 326 may include any suitable management computing system that receives data from a number of control systems (e.g., industrial control architecture 300). As such, the plant management system 326 may track operations of one or more facilities and one or more locations. In addition, the plant management system 326 may issue control commands to the components of the industrial automation system 10.

A security policy is a set of one or more rules or procedures that govern access and use of an organization's OT assets (e.g., industrial automation devices associated with OT machines). Characteristics of security policies may include confidentiality, availability, integrity, authentication, and non-repudiation of the organization's OT assets. A security policy may include identification data or information for components of the industrial automation system 10, or endpoints thereof, that are to be trusted, information regarding which communication ports to use, and the like. As such, a security policy sets forth provisions that may govern management of OT assets, access to such assets, backups of such assets, security of such assets, and the like. For example, a security policy may define provisions addressing acceptable usage of OT/IT assets, antivirus management, data backup and disaster recovery, change management, cryptography usage, data and asset classification, data retention, data support and operations, data usage, email/messaging protection policies, user identity and access management, incident response, threat protection, internet usage restrictions, mobile device policy, OT/IT network security, password and credential protocols, firmware/patch management, personnel security, physical and environmental security, malware/spyware/ransomware detection, system update schedules, wireless network access, guest access, and so forth. Accordingly, a security policy may govern, for example, how to manage who has access to what OT devices, what files and/or communications should be encrypted, characteristics of passwords (e.g., number of characters, upper and lower case letters, numbers, special characters), how often users must change their passwords, how often backups are done, how long backups are retained, guidelines for accessing wireless internet, what happens when a threat occurs, processes for onboarding/offboarding users as they start and leave positions, the process that occurs when a user changes roles, maintenance procedures, and so forth. As used herein, a "security update" may refer to a new security policy to be implemented by the OT asset or enforced at one or more security policy enforcement points within the industrial automation system 10, an update to an existing security policy implemented by the OT asset or enforced at the one or more security policy enforcement points within the industrial automation system 10, a new security setting to be implemented by the OT asset, an update to an existing security setting implemented by the OT asset, a new security rule to be implemented by the OT asset, an update to an existing security rule implemented by the OT asset, software (e.g., code) to be implemented by the OT asset, an update to at least a portion of software (e.g., code) implemented by the OT asset, data (e.g., configuration data) to be utilized by the software implemented by the OT asset, an update to existing data (e.g., configuration data) utilized by the software implemented by the OT asset, a new version of firmware to be implemented by the OT asset, an update to an existing version of firmware implemented by the OT asset, or the like. After receiving one or more security updates from the external network 322, the edge device 320 may push a security update to the components of the industrial automation system 10, or the components of the industrial automation system 10 may pull the security update from the edge device 320.

The industrial control system 12 may be communicatively coupled to a display/operator interface 328 (e.g., a human-machine interface (HMI)) and to devices of the industrial automation system 10 (e.g., OT assets). It should be understood that any suitable number of industrial control architectures 300 may be used in a particular embodiment of an industrial automation system 10 or in a facility that includes multiple industrial automation systems 10. The industrial control architecture 300 may facilitate representing components of the industrial automation system 10 through programming objects that may be instantiated and executed to provide simulated functionality similar or identical to the actual components, as well as visualization of the components, or both, on the display/operator interface 328. The programming objects may include code and/or instruction stored in the industrial control architecture 300 and executed by processing circuitry of the industrial control architecture 300. The processing circuitry may communicate with memory circuitry to permit the storage of the component visualizations.

As illustrated, the display/operator interface 328 depicts representations 330 of the components of the industrial automation system 10. The industrial control architecture 300 may use data transmitted by sensors 318 to update visualizations of the components via changing one or more statuses, states, and/or indications of current operations of the components. In certain embodiments, the edge device 320 may use data transmitted by the sensors 318 to update the visualizations of the components of the industrial automation system 10 over time. These sensors 318 may be any suitable device adapted to provide information regarding process conditions. Indeed, the sensors 318 may be used in a process loop (e.g., a control loop) that may be monitored and controlled by the industrial control architecture 300. As such, a process loop may be activated based on process inputs (e.g., an input from the sensor 318) or direct input from a person via the display/operator interface 328. The person operating and/or monitoring the industrial automation system 10 may reference the display/operator interface 328 to determine various statuses, states, and/or current operations of the industrial automation system 10, a particular component (e.g., OT asset), and/or digital twins of a particular component. Furthermore, the person operating and/or monitoring the industrial automation system 10 may adjust various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, the sensors 318 may gather OT data indicative of one or more operations of the industrial automation system 10 or the industrial control architecture 300. In this way, the OT data may be analog data or digital data indicative of measurements, statuses, alarms, or the like, associated with operation of the industrial automation system 10 or the industrial control architecture 300.

The industrial control architecture 300 described above may operate in an OT space in which OT data is used to monitor and control OT assets, such as the equipment illustrated in the stations 302, 304, 306, 308, 310, 312, 314, 316 of the industrial automation system 10 or other industrial equipment or components. The OT space, environment, or network generally includes direct monitoring and control operations that are coordinated by the industrial control architecture and a corresponding OT asset. For example, a programmable logic controller (PLC) (e.g., controller 12) may operate in the OT network to control operations of an OT asset (e.g., drive, motor). The industrial control architecture 300 may be specifically programmed or configured to communicate directly with the respective OT assets.

Figure 4:
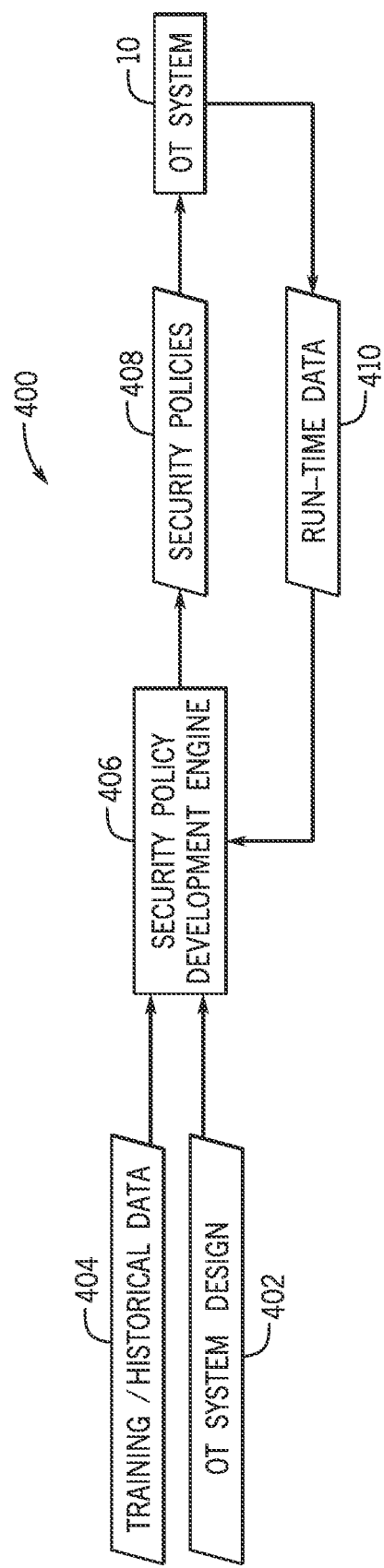
FIG. 4 is a flow chart illustrating a process for generating and revising security policies, in accordance with embodiments presented herein.

Security policies may be developed based on design artifacts of the industrial automation system 10 and/or information about the architecture of the industrial automation system 10 and how the industrial automation system 10 is intended to operate (e.g., product being produced, industry, location, anticipated operating conditions, and so forth). Further, once a set of security policies have been implemented and/or enforced at one or more security policy enforcement points while the industrial automation system 10 is operating, data collected during the operation of the industrial automation system 10 (e.g., run-time data, help ticket data, incident data, vulnerability data, data received from one or more service providers, one or more customers, one or more partner organizations, one or more suppliers, and so forth) may be used to generate recommended updates to the current set of implemented and/or enforced security policies. Accordingly, FIG. 4 is a flow chart illustrating a process 400 for generating and revising security policies. As shown, OT system design artifacts 402 and training/historical data 404 may be provided to an AI-based or machine learning-based security policy development engine 406 that applies one or more machine learning models. The OT system design artifacts 402 may include, for example, project code files, information about the structure of the industrial automation system 10, information about the components of the industrial automation system 10, and so forth. The training/historical data 404 may be training data provided by a service provider (e.g., based on data collected from one or more customers), internal training data generated by an enterprise based on data collected from one or more systems and/or facilities, publicly available training data, and the like. Further, the training/historical data 404 may be historical data from the industrial automation system 10, one or more portions of the industrial automation system 10, historical data collected from one or more industrial automation systems operated by an enterprise, historical data received/retrieved from outside of the enterprise, etc.

The AI-based security policy development engine 406 is trained using the training/historical data 404 to generate security policies 408 based on the provided OT system design data 402. That is, the AI-based security policy development engine 406 may consider the provided OT system design artifacts 402 to identify similar systems or systems with certain similar characteristics, and then develop a set of recommended security policies based on what was or was not successful in the identified similar systems, standard operating procedures in the industry, and so forth. For example, in developing the set of recommended security policies, the AI-based security policy development engine 406 may consider data from the same or other customers in the same or similar industries, the same or similar locations or regions, the same or similar climates, running similar processes, of similar size (e.g., number of facilities, number of employees, number of production lines, etc.), and so forth. Accordingly, the user provides the OT system design artifacts 402 to the AI-based security policy development engine 406, which analyzes the provided OT system design artifacts 402 and outputs a set of recommended security policies 408. More specifically, the AI-based security policy development engine 406 may compare data provided by the user to one or models and generate probabilities that one or more conditions are present or likely. The AI-based security policy development engine 406 may make decisions when the probabilities, or other calculated values, exceed threshold values or certain conditions are met. In some embodiments, the AI-based security policy development engine 406 may compare probabilities to similar models and/or probabilities and make connections and/or associations based upon probabilities being similar. For example, the AI-based security policy development engine 406 may access a data source of known reactions to similar probabilities, compare the known reactions to an updated list of new conditions (e.g., new vulnerabilities), and identify one or more recommended actions (e.g., new security policy or policies) to address the new condition. In some embodiments, the user may be notified of the new condition, and/or other users may be notified of the new condition. In some cases, new security policies, or policy updates may be recommended to other users and/or automatically implemented on their OT system based on a vulnerability or other condition being recognized. If needed, one or more models may be updated based on the new conditions.

In some embodiments, the AI-based security policy development engine 406 may be configured to prioritize maintaining and/or improving system availability during an event (e.g., security abnormality, suspicious network traffic, discovered vulnerability, exposed vulnerability, exploited vulnerability, malicious activity, unauthorized access, hack, distributed denial of service (DDoS) attack, malware, ransomware, spyware, privilege escalation, code or SQL injection attack, device failure, and so forth). For example, the AI-based security policy development engine 406 may be used to adjust the way and system or device operates in response to the event taking place by adjusting the code or logic associated with the system or device to ensure that the availability of the system or device is maintained in the aftermath of the event. In some embodiments, systems or devices may be pre-configured to detect when an event has occurred and automatically take remedial action (e.g., manipulate logic, re-route traffic, etc.) to maintain availability, and maintain security in the aftermath of the event taking place. In some embodiments, the remedial action may be temporary or otherwise put in place for a short period of time until the event can be investigated and a root cause identified. In other embodiments, the remedial action may be a medium-term or long-term solution that is implemented and maintained to prevent the event from happening again and/or minimize the ramifications of the event happening again.

Some, all, or none of the recommended security policies 408 may then be implemented and/or enforced via one or more security policy enforcement points within the industrial automation system 10. Data may be collected as the industrial automation system 10 operates. Though the collected data is shown in FIG. 4 as being run time data, it should be understood that the collected data may include, for example, help ticket data, incident data, vulnerability data, network traffic data, captured network traffic (e.g., data packets), device logs, data received from one or more service providers, one or more customers, one or more partner organizations, one or more suppliers, and so forth). The collected data 410 may be provided to the AI-based security policy development engine 406. Periodically, continuously, on request, or on some other schedule, the AI-based security policy development engine 406 may reevaluate the current set of security policies 408 based on the collected data 410, newly received training/historical data 404, or a combination thereof. If the AI-based security policy development engine 406 recommends adjustments to the implemented security policies, the AI-based security policy development engine 406 may output revised security policies 408 or an update to the recommended security policies 408. The user may choose to implement some of, none of, or all of the suggested policies. The reevaluation step may occur continuously, at some set time interval (e.g., weekly, monthly, quarterly, annually), or upon some triggering event (request by a user, new vulnerability detected, new training data received, etc.).

With the preceding in mind, FIG. 5 illustrates a schematic of an architecture for providing security policies as a service to one or more enterprises 500, each operating one or more industrial automation systems 10 in an enterprise network. In some embodiments, the enterprise 500 may operate multiple facilities 502, each having one or more industrial automation systems 10, managed by an enterprise system 324 via one or more computing devices 26. Though not pictured in FIG. 5, each facility 502 may include a plant management system. The industrial automation systems 10 may be disposed behind firewalls and/or within private networks that may be disposed and connected to one or more public networks (e.g., the internet). Devices within a private network may not be reachable by devices within the public network, but devices within the public network may be reachable by devices within the private network on a continuous basis through firewalls or intermittently via periodic transfer of files with physical media. In some embodiments, a facility 502 may have a single private network with one or more industrial automation systems 10. In other embodiments, a facility 502 may have multiple private networks, each with one or more industrial automation systems 10. In further embodiments, a private network may encompass multiple facilities 502. The service provider 30 may run a security policy and development engine 406 on a remote server or a cloud server that is accessible by the enterprises 500 via a public network (e.g., the internet).

Data 410 is collected from the industrial automation systems 10 in a facility 502 during operation. The collected data may include, for example, design artifacts, help ticket data, incident data, vulnerability data, network traffic data, captured network traffic (e.g., data packets), device logs, data received from one or more service providers, notes provided by an operator, software/firmware update data, warning data, error code data, temperature data, pressure data, speed/rotation data, quality control data, and so forth. Design artifacts 402 and/or operational data 410 are provided to the enterprise system 324, which aggregates and transmits the data 402, 410 to the service provider. Data aggregation may include, for example, processing and combining data received from multiple different data sources. In some embodiments, the aggregating device may combine received data with data generated by the aggregating device or stored in memory on the aggregating device before the combined data is transmitted. The service provider inputs the design artifacts 402 and/or operational data 410 to the trained security policy and development engine 406, which outputs one or more recommended security policies 408. The recommended security policies 408 are transmitted to the enterprise system 324, which implements and/or enforces security policies (e.g., via one or more security policy enforcement points) within the enterprise 500 and/or distributes security policies 408 to the facilities 502 or particular industrial automation systems 10 within the enterprise 500 to be implemented. Once security policies 408, or updates to security policies, have been implemented and/or enforced, new data 410 may be collected and transmitted back to the service provider 30, either directly or via the enterprise system 324. The service provider 30 may use the new data 410 to retrain and/or refine the security policy and development engine 406, or to evaluate the revised security policies 408.

Though the embodiment shown in FIG. 5 uses the enterprise system 324 (e.g., instantiated on the computing device 26), to aggregate data 402, 410 and implement, enforce, and/or disseminate security policies 408, it should be understood that embodiments are envisaged in which a plant management system or industrial automation controller performs these functions. That is, aggregating data 402, 410 and implementing/enforcing security policies 408 may be performed at various levels of an enterprise's structure between particular industrial automation systems or devices and the enterprise level.

FIG. 6 illustrates a schematic of an architecture for providing training data 404 and/or machine learning models (e.g., a security policy development engine 406) to one or more enterprises 500, each operating one or more industrial automation systems 10. As with FIG. 5, the enterprise 500 may operate multiple facilities 502, each having one or more industrial automation systems 10, managed by the enterprise system 324 via one or more computing devices 26. Though not pictured, each facility 502 may include a plant management system. The industrial automation systems 10 may be disposed behind firewalls and/or within private networks defined by one or more firewalls. A single private network may encompass an entire facility 502, one or more industrial automation systems 10 within a facility, or multiple facilities 502. The service provider 30 provides machine learning models (e.g., a security policy development engine 406) or training data for training machine learning models to the enterprise 500.

Data 410 is collected from the industrial automation systems 10 in a facility 502 during operation. The collected data may include, for example, design artifacts, help ticket data, incident data, vulnerability data, network traffic data, captured network traffic (e.g., data packets), device logs, data received from one or more service providers, notes provided by an operator, software/firmware update data, warning data, error code data, temperature data, pressure data, speed/rotation data, quality control data, and so forth. Design artifacts 402 and/or operational data 410 are provided to the enterprise system 324, which aggregates and inputs the data 402, 410 to the security policy development engine 406. The security policy development engine 406 outputs one or more recommended security policies 408. The recommended security policies 408 are implemented and/or enforced (e.g., via one or more security policy enforcement points) within the enterprise 500 and/or distributed by the enterprise system 324 to the facilities 502 or particular industrial automation systems 10 within the enterprise 500. Once security policies 408, or updates to security policies, have been implemented and/or enforced, new data 410 may be collected and transmitted back to the security policy development engine 406, either directly or via the enterprise system 324. The new data 410 may be used to retrain and/or refine the security policy and development engine 406, or to evaluate the revised security policies 408.

Though the embodiment shown in FIG. 6 uses the enterprise system 324 (e.g., instantiated on the computing device 26), to aggregate data 402, 410, run the security policy development engine 406, and implement, enforce, and/or disseminate security policies 408, it should be understood that embodiments are envisaged in which a plant management system or industrial automation controller performs these functions. That is, aggregating data 402, 410, running the security policy development engine 406, and implementing/enforcing security policies 408 may be performed at various levels of an enterprise's structure (e.g., the device level, the system level, the facility level, the enterprise level, one or more intermediate levels, or distributed among multiple levels).

In some embodiments, the security policy development engine 406 may be run on an edge device in an OT network. In such embodiments, the edge device may receive design artifacts and/or run-time data from one or more devices on an OT network, input the received data to a security policy development engine 406 running on the edge device, and generate a set of recommended security policies, which may be automatically implemented/enforced, presented to a user for approval, presented to a user for consideration, or some combination thereof. The security policy development engine 406 may be running on a processor of the edge device within an operating system, or the security policy development engine 406 may be running in a container that is managed by a container orchestration system (e.g., Docker, KUBERNETES®) instead of, or in addition to, the edge device. The container orchestration system may operate in an IT environment and may include a cluster of multiple computing devices that coordinates an automatic process of managing or scheduling work of individual containers (e.g., operating system level virtualization) for applications within the computing devices of the cluster. In other words, the container orchestration system may be used to automate various tasks at scale across multiple computing devices. By way of example, the container orchestration system may automate tasks such as configuring and scheduling of containers, provisioning deployments of containers, determining availability of containers, configuring applications in terms of the containers that they run in, scaling of containers to equally balance application workloads across an infrastructure, allocating resources between contains, performing load balancing, traffic routing and service discovery of containers, performing health monitoring of containers, securing the interactions between containers, and the like. In any case, the container orchestration system may use configuration files to determine a network protocol to facilitate communication between containers, a storage location to save logs, and the like. The container orchestration system may also schedule deployment of containers into clusters and identify a host (e.g., node) that may be best suited for executing the container. After the host is identified, the container orchestration system may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry as container images. The container registry may be any suitable data storage or database that may be accessible to the container orchestration system. The container image may correspond to an executable software package that includes the tools and data employed to execute a respective application. That is, the container image may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system. The deployment configuration file may be stored in the container registry along with the respective container images associated with the deployment configuration file. The deployment configuration file may include a list of different pods and a number of replicas for each pod that should be operating within the container orchestration system at any given time. Each pod may correspond to a logical unit of an application, which may be associated with one or more containers. The container orchestration system may coordinate the distribution and execution of the pods listed in the deployment configuration file, such that the desired state is continuously met. In some embodiments, the container orchestration system may include a primary node that retrieves the deployment configuration files from the container registry, schedules the deployment of pods to the connected nodes, and ensures that the desired state specified in the deployment configuration file is met. For instance, if a pod stops operating on one node, the primary node may receive a notification from the respective worker node that is no longer executing the pod and deploy the pod to another worker noted to ensure that the desired state is present across the cluster of nodes.

The container orchestration system includes a cluster of computing devices, computing systems, or container nodes that may work together to achieve certain specifications or states, as designated in the respective container. In some embodiments, container nodes may be integrated within industrial control systems. That is, container nodes may be implemented by the industrial control systems, such that they appear as worker nodes to the primary node in the container orchestration system. In this way, the primary node of the container orchestration system may send commands to the container nodes that are also configured to perform applications and operations for the respective industrial equipment and components.

In some embodiments, the enterprise may collect data to transmit back to the service provider 30 that provides some information about how the security policy development engine 406 is running and the effectiveness of the policies generated by the security policy development engine 406. Accordingly, the service provider 30 may use data collected from one or more customer enterprises 500 to improve machine learning models and/or the training data provided to the enterprises 500. Customers may choose to opt in or opt out of providing data to the service provider 30. In some cases, because enterprises may be hesitant to share data, data may be anonymized, masked, pseudonymized, generalized, or otherwise scrubbed before being transmitted to the service provider. For example, characteristic data elements (e.g., names, addresses, IP addressed, MAC addresses, phone numbers, network names, password, employee names, employee numbers, employee information, etc.) within the data may be identified and removed and/or changed before being transmitted. Further, data elements related to industrial processes, settings of the industrial automation systems, set points, trade secrets, intellectual property, or other proprietary information may be identified and removed or changed before being transmitted. Further, the service provider 30 may take additional steps to secure the data received by the enterprise 500, such as using a secure communication channel, encrypting data for transmission, encrypting data for storage, and so forth.

The present disclosure includes techniques for using an AI-based security policy development engine to develop security policies based on OT system design artifacts and/or run-time data collected during operation of an OT system. In one embodiment, the AI-based security policy development engine is hosted by a service provider. Customers send design artifacts for OT systems to the service provider, the service provider runs the AI-based security policy development engine on the received design artifacts to generate a set of recommended security policies that are then provided to the customer. The customer may then choose whether or not to implement/enforce the recommended security policies in their OT system. Additionally or alternatively, the customer may collect run-time data from their OT system and provide the run-time data to the service provider, along with a set of existing security policies. The service provider runs the AI-based security policy development engine on the run-time data to generate a set of recommended changes to the existing security policies, which are subsequently provided to the customer. In such an embodiment, the AI-based security policy development engine may be continuously or periodically retrained or updated based on new data received from customers and/or internally generated data.

In another embodiment, the AI-based security policy development engine is provided to the customer by a service provider (e.g., RA) and hosted by the customer, either in the cloud, on-premises, or at a remote location. The AI-based security policy development engine may be provided to the customer already trained, the service provider may provide training data for training the AI-based security policy development engine, or the customer may choose to train the AI-based security policy development engine using its own training data. The customer provides design artifacts for an OT system to the AI-based security policy development engine, which generates a set of recommended security policies for the OT system. The customer may then implement and/or enforce the recommended security policies as they see fit. Additionally or alternatively, once security policies have been implemented and/or enforced on an OT system, the customer may collect run-time data from the OT system and periodically run the AI-based security policy development engine on the collected run-time data to generate a set of recommended changes or updates to the existing security policies. The customer may then determine whether or not to implement the recommended changes to the existing security policies. In some cases, if the customer chooses to, collected data (e.g., recommended security policies, recommended changes to security policies, run-time data from before and after security policies or changes to security policies were implemented, design artifacts, etc.) may be anonymized and provided to the service provider to contribute to the service provider's training data. Accordingly, the service provider may occasionally provide training updates to customers based on data collected from other customers that may be used to improve the AI-based security policy development engine hosted by the customer.

Technical effects of using the present techniques include an enterprise having better quality security policies that keep pace with or outpace industry standards and/or best practices. Further, the present techniques result in security policies that are proactive and implemented before a vulnerability is exploited, rather than reactive and implemented in response to a vulnerability being exploited. As such, the present techniques result in more secure operational technology networks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer readable medium storing instructions that, when executed by a processor, cause the processor to perform operations comprising:

receiving data from one or more industrial automation systems, wherein the data comprises design artifacts of the one or more industrial automation systems, run time data collected from the one or more industrial automation systems, or both;

inputting the data to a machine learning-based security policy development engine to generate a set of recommended security policies for the one or more industrial automation systems based on the data, wherein the machine learning-based security policy development engine is configured to compare the data to one or more models and generate probabilities of the presence or likelihood of one or more conditions;

receiving the set of recommended security policies for the one or more industrial automation systems output by the security policy development engine;

transmitting the set of recommended security policies to the one or more industrial automation systems for implementation, wherein the one or more industrial automation systems are configured to implement the set of recommended security policies by controlling one or more industrial automation devices to automatically perform one or more remedial actions in response to an event based on the probabilities exceeding one or more threshold values;

anonymizing the data;

transmitting the anonymized data to a service provider;

in response, receiving, from the service provider, training data for the security policy development engine; and retraining the security policy development engine based on the training data.

2. The non-transitory computer readable medium of claim 1, wherein the data is received from one or more industrial automation systems at an edge device, and wherein the set of recommended security policies are transmitted to the one or more industrial automation systems from the edge device.

3. The non-transitory computer readable medium of claim 2, wherein the security policy development engine is configured to run in a container on the edge device.

4. The non-transitory computer readable medium of claim 3, wherein the container is managed by a container orchestration system.

5. The non-transitory computer readable medium of claim 1, wherein the operations comprise:

receiving, from the service provider, an updated version of the security policy development engine; and replacing the security policy development engine with the updated version of the security policy development engine.

6. The non-transitory computer readable medium of claim 1, wherein the operations comprise:

receiving additional data from the one or more industrial automation systems;

inputting the additional data to the machine learning-based security policy development engine to generate an additional set of recommended security policies for the one or more industrial automation systems;

receiving the additional set of recommended security policies for the one or more industrial automation systems output by the security policy development engine; and transmitting the additional set of recommended security policies to the one or more industrial automation systems for implementation.

7. The non-transitory computer readable medium of claim 1, wherein the instructions are configured to be executed by the processor of a computing device of an enterprise control system configured to control industrial automation systems disposed at multiple facilities operated by an enterprise.

8. The non-transitory computer readable medium of claim 1, wherein the instructions are configured to be executed by the processor of a computing device of a plant management system configured to control industrial automation systems disposed in a facility operated by an enterprise.

9. The non-transitory computer readable medium of claim 1, wherein:
receiving the data from the one or more industrial automation systems comprises:
receiving first run time data from a first industrial automation system;
receiving second run time data from a second industrial automation system; and
receiving incident data from an operational technology network that includes the first industrial automation system and the second industrial automation system;
wherein the operations comprise aggregating the first run time data, the second run time data, and the incident data.

10. The non-transitory computer readable medium of claim 1, wherein the set of recommended security policies define access, use, or both, of industrial automation assets, including the one or more industrial automation systems, operated by an enterprise.

11. The non-transitory computer readable medium of claim 1, wherein anonymizing the data comprises:
identifying characteristic data elements associated with the one or more industrial automation systems within the data, wherein the characteristic data elements comprise employee information, network information, operating parameters, or a combination thereof associated with the one or more industrial automation systems; and
removing the characteristic data elements from the data.

12. A method, comprising:
receiving, from an enterprise network, data associated with one or more industrial automation systems operated by an enterprise, wherein the data comprises design artifacts of the one or more industrial automation systems, run time data collected from the one or more industrial automation systems, or both;
inputting the data to a machine learning-based security policy development engine to generate a set of recommended security policies for the enterprise based on the data, wherein the machine learning-based security policy development engine is configured to compare the data to one or more models and generate probabilities of the presence or likelihood of one or more conditions;
receiving the set of recommended security policies for the one or more industrial automation systems output by the security policy development engine, wherein the set of recommended security policies define access, use, or both, of the one or more industrial automation systems operated by the enterprise;
transmitting the set of recommended security policies to the enterprise, wherein the enterprise is configured to implement the set of recommended security policies by controlling one or more industrial automation devices of the one or more industrial automation systems to automatically perform one or more remedial actions based on the probabilities exceeding one or more threshold values;
anonymizing the data;
transmitting the anonymized data to a service provider;
in response, receiving, from the service provider, training data for the security policy development engine; and
retraining the security policy development engine based on the training data.

13. The method of claim 12, wherein the data comprises help ticket data, incident data, vulnerability data, data received from a service provider, data received from a customer, data received from a partner organization, data received from a supplier, or any combination thereof.

14. The method of claim 12, comprising:
receiving, from the enterprise network, additional data from the one or more industrial automation systems;
inputting the additional data to the machine learning-based security policy development engine to generate an additional set of recommended security policies for the one or more industrial automation systems;
receiving the additional set of recommended security policies for the one or more industrial automation systems output by the security policy development engine; and
transmitting the additional set of recommended security policies to the enterprise.

15. The method of claim 12, wherein anonymizing the data comprises:
identifying characteristic data elements associated with the one or more industrial automation systems within the data, wherein the characteristic data elements comprise employee information, network information, operating parameters, or a combination thereof associated with the one or more industrial automation systems; and
editing the characteristic data elements, wherein editing the characteristic data elements comprises generalizing, pseudonymizing, or masking the characteristic data elements.

16. An industrial automation system, comprising:
a processor; and
a memory, accessible by the processor, and storing instructions that, when executed by the processor, cause the processor to perform operations comprising:
collecting data from one or more connected industrial automation devices, wherein the data comprises design artifacts of the one or more industrial automation devices, run time data collected from the one or more industrial automation devices, incident data for an operational technology network on which the one or more industrial automation devices operate, or any combination thereof;
transmitting the data to an enterprise control system of an enterprise that operates the one or more industrial automation devices;
receiving, from the enterprise control system, a set of recommended security policies, wherein the set of recommended security policies define access, use, or both, of industrial automation assets, including the one or more industrial automation devices, operated by the enterprise, wherein the enterprise control system is configured to execute a machine learning-based security policy development engine to generate the set of recommended security polices, and the machine learning-based policy development engine is configured to compare the data to one or more models and generate probabilities of the presence or likelihood of one or more conditions;
implementing one or more of the set of recommended security policies on the one or more industrial automation devices, wherein implementing one or more of the set of recommended security policies on the one or more industrial automation devices comprises controlling the one or more industrial automation devices to automatically perform one or more remedial actions in response to an event based on the probabilities exceeding one or more threshold values;

anonymizing the data; and transmitting the anonymized data to a service provider.

17. The industrial automation system of claim 16, wherein the operations comprise:

collecting additional data from the one or more industrial automation devices;

transmitting the additional data to the enterprise control system;

receiving, from the enterprise control system, an additional set of recommended security policies for the one or more industrial automation devices; and implementing one or more of the additional set of recommended security policies on the one or more industrial automation devices.

18. The industrial automation system of claim 16, wherein the operations comprise:

causing one or more security policies of the set of recommended security policies to be displayed on a user interface for review;

receiving an input approving the displayed one or more security policies of the set of recommended security policies; and implementing the approved one or more security policies of the set of recommended security policies.

19. The industrial automation system of claim 16, wherein collecting data from the one or more industrial automation devices comprises:

receiving first run time data from a first industrial automation device;

receiving second run time data from a second industrial automation device; and receiving incident data from an operational technology network that includes the first industrial automation device and the second industrial automation device;

wherein the operations comprise aggregating the first run time data, the second run time data, and the incident data.

20. The industrial automation system of claim 16, wherein controlling the one or more industrial automation devices comprises adjusting one or more communication permissions associated with sending data to or receiving data from the one or more industrial automation devices, adjusting data usage associated with the one or more industrial automation devices, or a combination thereof.

* * * * *